United States Patent Office 3,377,022
Patented Apr. 9, 1968

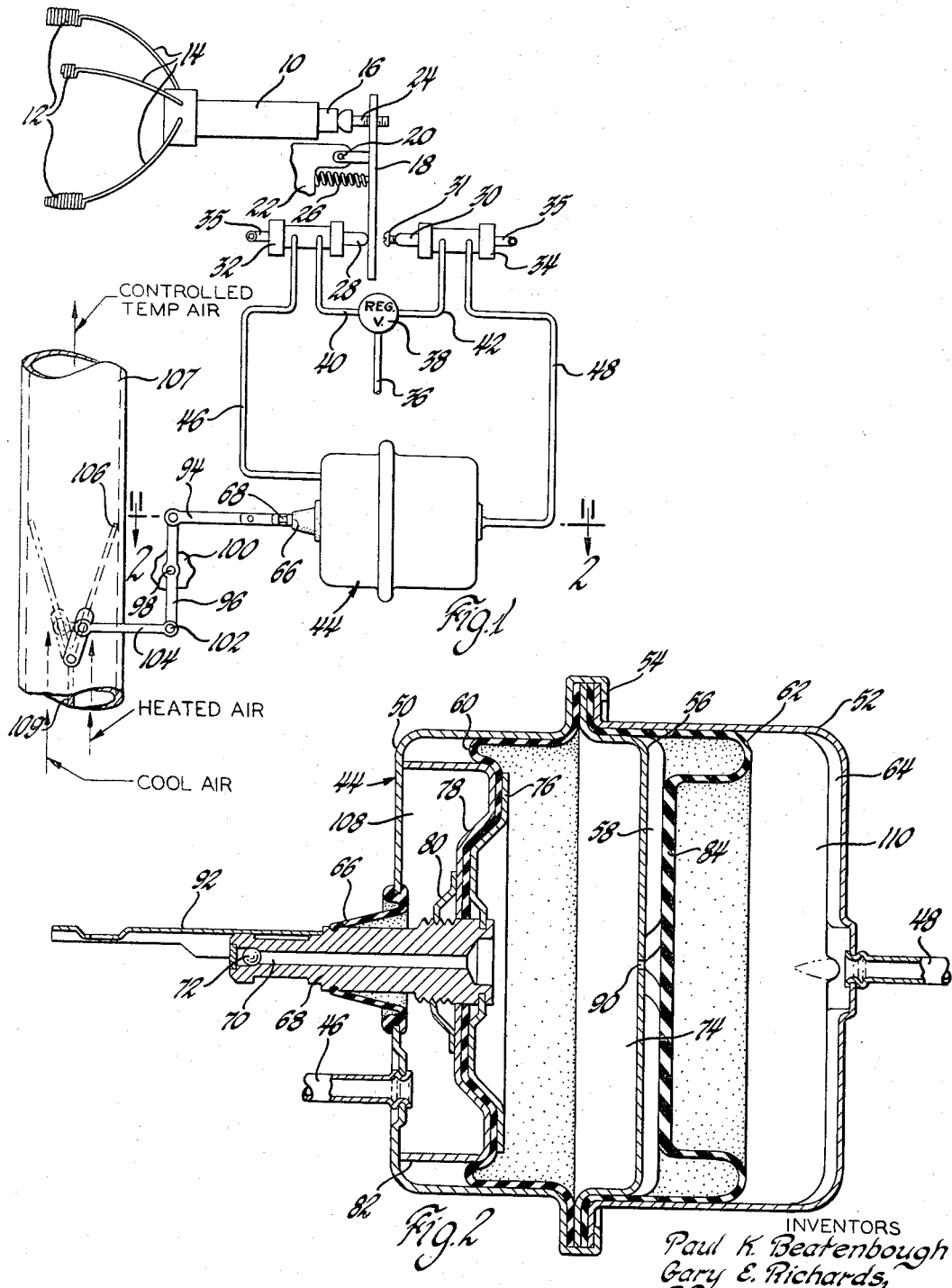

3,377,022
THERMOMECHANICAL AUTOMATIC CONTROL SYSTEM FOR HEATING AND COOLING AIR
Paul K. Beatenbough, Medina, Gary E. Richards and Philip S. Rogers, Lockport, and Carl A. Scherer, Clarence Center, N.Y., assignors to General Motors Corporation, Detroit, Mich., a corporation of Delaware
Filed Dec. 16, 1965, Ser. No. 514,306
2 Claims. (Cl. 236—13)

ABSTRACT OF THE DISCLOSURE

A system for automatically controlling the temperature of air flowing to and through a zone such as a vehicle passenger compartment, the system including means for sensing a variation in the zone temperature, and elements actuated by power derived from a source outside the system and the zone for operating damper means to compensate for the variation.

State of the prior art

Kahl 2,264,848: This patent teaches the use of a damper for directing cooled or heated air to an automobile passenger compartment.

Kreuttner 2,997,240: This patent discloses a thermostatic control of the proportions of cool and warm air sent into an enclosure by utilizing air pressure taken from within the system, special attention being given to the balancing of the valve used.

Pendergast 2,327,737: This disclosure deals with a bellows thermostat controlling the flow of heated or cooled air to a passenger cabin, a clamper and valve being employed.

Description of the present invention

In the drawings:

FIGURE 1 is a schematic view of an automatic control system constituting the present invention; and FIGURE 2 is an enlarged sectional view of a vacuum-liquid motor utilized in the system, the view being taken along the line 2—2 of FIGURE 1.

The system uses a pellet type motor assembly 10 which may be of the type disclosed in the United States Patent 2,843,151, issued July 15, 1958, in the name of Frederick A. Greenawalt. Further details of this motor assembly are not given herein as they form no part of the present invention. It suffices to say that liquid-filled sensors 12 are connected to the motor assembly 10 by capillary tubes 14 so that plunger 16 will emerge from the assembly 10 an extent dependent upon a temperature rise detected by the sensors 12 at spaced points with respect to a room or zone to be heated or cooled. Preferably, one sensor reflects outside ambient temperature; a second is placed at the outlet of a discharge duct; and a third is located at a spot in the room or zone to reflect the general temperature of the latter. As the temperature on any or all sensors 12 lowers, spring means 26 is relied upon to cause the plunger 16 again to enter into the casing of the assembly 10 by an amount proportional to the temperature change.

A level 18 is arranged to be actuated by the sensing means and is pivoted at 20 on a fixed support 22. One end portion of the lever bears an adjustable button 24 which is maintained in contact with the motor plunger 16 by means of a compressed spring 26. The other end portion of the lever is arranged to "float" between the opposed ends of two plungers 28 and 30. The plunger 30 is provided with a screw 31 for adjustment purposes. Each plunger 28 or 30 is a part of a valve control device or fluid valve 32 or 34 of the "on-off" poppet type so that a movement of the plunger 28 to the left opens the valve 32 and permits the valve 34 to close and a movement of the plunger 30 to the right opens the valve 34 and permits the valve 32 to close. Each of the valves 32 and 34 is a conventional type of valve suitable to control flow of air through a vacuum line. A small bleed 35 is located in each valve 32 and 34 to bleed down the vacuum in the output thereof when that valve is closed. A valve of this general type is disclosed in the United States Patent No. 2,861,482, granted Nov. 25, 1958, in the name of H. O. Schjolin.

A source of raw vacuum may be the intake manifold of an internal combustion engine. This source is connected by a line 36 to a vacuum regulator valve 38 capable of converting raw vacuum to a substantially constant value in each of lines 40 and 42.

A liquid-vacuum motor is shown at 44. One end of this motor is connected by a conduit 46 to the valve 32 and the other end is connected by a conduit 48 to the valve 34. The motor 44 has a casing of two exterior cup-like parts 50 and 52 (FIGURE 2) with the periphery of the part 50 crimped as at 54 to hold the casing together. An interior cup portion 56 of rigid construction and having radial corrugations 58 in it has its periphery locked between the margins of two flexible diaphragms 60 and 62 all held in fluid-tight relation by the crimping at 54. The end wall of the casing part 52 is provided with radial corrugations 64. The conduit 48 is connected to the axial center of the part 52 whereas the part 50 is apertured at its center to receive a flexible elastomeric sealing boot 66 permitting an axially bored member 68 to move axially and with respect to the motor 44. A bore 70 of the member 68 is sealed at 72 and communicates with a zone 74 defined between the flexible diaphragm 60 and the cup portion or rigid partition 56. Two diaphragm retaining plates 76 and 78 are retained on the member 68 by a threaded washer 80 and the plate 78 has a cylindrical wall 82 adapted to abut the inner wall surface of the casing part 50 while providing an annular space for rolling action on the part of the diaphragm 60. The conduit 46 is connected to communicate with the zone between the part 50 and the diaphragm 60. The diaphragm 62 is designed to "roll" along the inner wall of the casing part 52 and this action is aided by thickening the diaphragm over a substantial central portion 84. A bleed hole or restricted bypass 90 is formed in the partition 56 and liquid fills and is sealed at 72 within the space defined between the diaphragms 60 and 62 which space includes the zone 74 and all possible voids between the diaphragm 62 and the partition 56.

A bracket 92 is fixed to the member 68 to facilitate connection to a link 94 (FIGURE 1). This link is connected to one end of a lever 96 and the latter is pivoted as at 98 to a fixed support 100. The other end of the lever 96 is pivoted as at 102 to a link 104 connected to a damper 106.

The air distribution duct work is not fully shown in the drawings but it will be understood that the angular position of the damper 106 determines the proportions of heated air and cool air flowing through a duct 107, or its equivalent, and therefore the temperature of air ultimately discharged by that duct into a vehicel passenger compartment or the like. A partition 109 in the duct separates heated air from cool air immediately up to the damper 106 so that the latter may act as a proportioning damper. This duct work is not a part of the present invention and may take various forms such as that disclosed in the United States Patent No. 3,084,866, granted Apr. 9, 1963, in the name of Earl E. Keightly.

In operation of the system, and assuming that the three capillary tube sensors 12 call for a cooling effect, the existent heat requiring such an effect will cause the plunger 16 to tilt the lever 18 in a clockwise direction against the spring 26. This will cause the valve 32 to be opened admitting controlled vacuum from the valve 38 to the line 46 and into the zone 108 of the motor 44. This will cause the diaphragm 60 ultimately to move toward the position depicted in FIGURE 2 and consequently place the damper 106 toward its position indicated in full lines in FIGURE 1. As the damper 106 moves toward the new position, cooler or ambient air or refrigerated air quantity will increase in relation to the heated air in duct 107. This cooler air to the zone or compartment will be reflected in the temperature of the sensors 12 causing the plunger 16 to retract allowing the lever 18 to move in a counterclockwise position, closing valve 32. When valve 32 is closed the space 108 of the motor 44 is vented to atmosphere through bleed hole 35 which stops the movement of motor 44 and damper 106. This intermediate position of the damper in permitting cooler air in a definite proportion to heated air to enter the compartment to be conditioned, maintains the required temperature. If the compartment suddenly requires substantially warmer air as determined by the sensors 12, the plunger 16 will be pushed to the left as viewed in FIGURE 1 and the lever 18 will be moved counterclockwise by virtue of the expansion of the compressed spring 26. The lever 18 will then activate the plunger 30 to open the valve 34 with a consequent simultaneous closing of the valve 32. The opening of the valve 34 directs vacuum by way of the line 48 into the zone 110. This pulls the diaphragm 84 to the right as viewed in FIGURE 2 and as the liquid between the diaphragms 60 and 62 slowly passes through the bleed hole 90, the diaphragm 60 will move to the right and cause the damper to assume its dotted line position as indicated in FIGURE 1. With this position of the damper, heated air will be admitted to the passenger compartment or zone requiring the warmer air.

There is no mechanical connection between the two diaphragms 60 and 62 and the bleed hole 90 eliminates the possibility of cycling action. When the damper 106 is properly and automatically positioned to satisfy conditions, the lever 18 will float between the two valves 32 and 34 so neither of the latter is open and any slight change in the passenger compartment temperature will be detected and compensation or correction is promptly made. Any air discharge temperature to the passenger compartment can be maintained between that of the incoming heated air and that of the incoming cool or refrigerated air. Each of the valves 32 and 34 is not operated in mid-positions. In a given installation the lengths of the coiled capillary tubing 12 should be carefully determined to effect maximum accuracy. It is necessary that the sensors follow the changing discharge air temperatures reasonably closely. Failure to do so will result in moving the damper 106 too far, making a reverse correcting movement necessary. If the condition is too severe, continuous cycling will result. The time to move the damper 106 through a given angular range may be varied by changing the diameters, lengths or air velocities (across the capillaries) of the sensors 12. If desired, the position of the pivot 20 may be changed from the dash by means of a Bowden wire to assure manual calibration or selectivity in accordance with personal preferences.

A satisfactory liquid for the motor 44 is 45% water and 55% glycol, but this is dependent upon the particular use. When the vacuum is bled down from a chamber at one end of the motor 44 and is applied to the opposite chamber, the speed of the damper 106 is controlled by the viscous flow through the orifice 90.

We claim:

1. A system for controlling the temperature of air flowing through a zone, said system comprising air temperature sensing means associated with said zone, means arranged to be actuated by said sensing means to move in accordance with a temperature variation in said zone, a source of low pressure, a source of higher pressure, two on-off valves each connected to both of said sources, said actuating means being operable to close one of said fluid valves to said low pressure source and to close it to said higher pressure source and simultaneously to effect the reverse situation with respect to the other of said fluid valves, damper means proportioning the flow of cool and warmer air to said zone, a motor including a casing with two chambers separated by a partition, a restricted bypass of said partition connecting zones on opposite sides of the latter, a flexible diaphragm traversing each of said chambers, one of said diaphragms being linked to said damper means to operate the same, means connecting each of said chambers outside its corresponding diaphragm to one of said valves, and a fluid filling the said zones so that a flow of said fluid through said restricted bypass is adapted to affect speed of movement of said damper means.

2. A system as set forth in claim 1, said partition being rigid, said restricted bypass being a bleed hole in said partition, the said diaphragms being rolling diaphragms, the other of said diaphragms being supported only at its periphery, said fluid being a liquid, and the motor being such that a movement of one of said diaphragms in response to a connection with said power sources through one of said valves will effect a movement of the other of said diaphragms at a rate determined by flow of said liquid through said bleed hole.

References Cited
UNITED STATES PATENTS

| | | | |
|---|---|---|---|
| 1,764,799 | 6/1930 | Kysor | 236—87 X |
| 2,729,394 | 1/1956 | Peterson et al. | 236—13 |
| 2,815,915 | 12/1957 | Salerno | 236—13 |
| 2,835,449 | 5/1958 | Joesting | 236—13 |
| 2,997,240 | 8/1961 | Kreuttner | 236—13 |
| 3,310,234 | 3/1967 | Kennedy | 236—13 |

EDWARD J. MICHAEL, *Primary Examiner.*